US007047828B2

(12) United States Patent
Blaszcak et al.

(10) Patent No.: US 7,047,828 B2
(45) **Date of Patent: *May 23, 2006**

(54) PIPETTE TIP WITH AN INTERNAL SLEEVE AND STABILIZING PROJECTIONS

(75) Inventors: Peter Paul Blaszcak, Sebastopol, CA (US); Howard Keith Spencer, Angwin, CA (US); Thomas Taggart, Sebastopol, CA (US)

(73) Assignee: Quality Scientific Plastics, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/364,667

(22) Filed: Feb. 12, 2003

(65) Prior Publication Data

US 2004/0011145 A1 Jan. 22, 2004

Related U.S. Application Data

(63) Continuation-in-part of application No. 10/140,990, filed on May 9, 2002, now Pat. No. 6,955,077.

(51) Int. Cl.
*G01N 1/00* (2006.01)

(52) U.S. Cl. ..................................................... 73/864.01

(58) Field of Classification Search ..............................
73/864.13–864.18, 864.01; 422/100
See application file for complete search history.

(56) References Cited

U.S. PATENT DOCUMENTS

| | | | | |
|---|---|---|---|---|
| 4,474,071 | A * | 10/1984 | Marteau d'Autry | 73/864.13 |
| 4,647,419 | A | 3/1987 | Helfer et al. | 264/328.9 |
| 4,672,857 | A * | 6/1987 | MacDermott | 73/864.18 |
| 4,748,859 | A | 6/1988 | Magnussen, Jr. et al. | 73/864.01 |
| 4,824,641 | A * | 4/1989 | Williams | 73/864.12 |
| 5,200,151 | A * | 4/1993 | Long | 422/100 |
| 5,240,397 | A | 8/1993 | Fay et al. | 425/145 |
| 6,596,240 | B1 * | 7/2003 | Taggart et al. | 422/100 |
| 2002/0092367 | A1 * | 7/2002 | Bell | 73/864.14 |

* cited by examiner

*Primary Examiner*—Hezron Williams
*Assistant Examiner*—Nashmiya Fayyaz
(74) *Attorney, Agent, or Firm*—Andrus, Sceales, Starke & Sawall, LLP

(57) ABSTRACT

A pipette tip member has an elongated tubular receptacle including a sidewall with a plurality of stabilizing projections extending from the sidewall for aligning the pipette shaft, and a sidewall with a bifurcated section that includes first, second, and third sidewall portions. The first sidewall portion defines a base wall and the second and third sidewall portions branch therefrom. The second sidewall portion is an outside branch wall, and the third sidewall portion is an inside branch wall spaced substantially parallel with and radially inward from the second sidewall portion. The inside branch wall is flexible in the radial direction and engages a pipette shaft when it is inserted into the receptacle and to form a fluid-tight seal therewith. A method of forming a pipette tip member is also enclosed.

9 Claims, 4 Drawing Sheets

PIPETTE TIP WITH AN INTERNAL SLEEVE AND STABILIZING PROJECTIONS

CROSS-REFERENCE TO RELATED APPLICATIONS

The present application is a continuation-in-part of prior application Ser. No. 10/140,990 entitled "Pipette Tip With and Internal Sleeve and Method for Forming Same," filed May 9, 2002, now U.S. Pat. No. 6,955,077 the entire contents of which are incorporated by reference.

BACKGROUND OF THE INVENTION

Pipettes and pipette tips come in many configurations. Seals between the pipette and the tip can be formed in several different ways: two conical surfaces coming together, raised rings forming annular pressure points, and a blunt corner or radiused corner forced into a conical tip. To insure a good seal, the pipette must be inserted into the pipette tip with enough force to affect a seal by displacing plastic in the tip. In some instances this force can be considerable.

One solution is proposed in U.S. Pat. No. 4,748,859 to Magnussen, Jr., et al. A disposable pipette tip member is disclosed having three inner coaxial annular sealing bands spaced axially from an open proximal end for receiving a conical pipette tip mounting shaft. The first two sealing bands are relatively resilient and simultaneously engage, guide and laterally support the pipette shaft as it enters the tip member to form annular fluid-tight seals with the shaft. The third band is relatively rigid and upon engagement with the shaft, forms a third annular fluid-tight seal and a controllable stop for the shaft such that the tip member is seated on the shaft adjacent the pipette tip ejector mechanism.

Removal of the tip can be difficult as well, and over many uses during a day, can cause fatigue and even injury over time. A need exists for a method for producing a pipette tip that can be inserted and ejected with a minimal force, maintain a good seal, and provide for a good fit on a variety of pipettes.

SUMMARY OF THE INVENTION

The present invention is directed to a pipette tip member for releasably mating with a pipette shaft. The tip member comprises an elongated tubular receptacle having a plurality of stabilizing projections extending from the sidewall for aligning the pipette shaft and a sidewall with a bifurcated section. The bifurcated section comprises first, second, and third sidewall portions, and the first sidewall portion comprises a base wall and the second and third sidewall portions branch therefrom and extend substantially axially from the first sidewall portion in the proximal direction. The second sidewall portion comprises an outside branch wall, and the third sidewall portion comprises an inside branch wall spaced radially inward from the second sidewall portion. The tip member can have a generally conical shape tapered from a rear opening at a proximal end to a tip opening at a distal end.

In one embodiment, the second and third sidewall portions are substantially parallel. In an alternate embodiment, the third sidewall portion may extend inward at an angle between about 0° and about 5° with respect to the second sidewall portion.

In one embodiment the second and third sidewall portions are substantially parallel. Also, the third sidewall portion has a free end and the second sidewall portion extends beyond the free end of third sidewall portion in the proximal direction. In other embodiments free end of the third sidewall portion may be beveled, and the third sidewall portion can be bendably flexible in the radial direction. A recess is defined between the second and third sidewall portions and the recess has an opening toward the proximal end of the tip member.

The present invention is also directed to a method of forming a tubular pipette tip member, comprising the steps of: providing a mold including a mold core, the mold core extending from a proximal end to a distal end and having an exterior wall with a conical shape, the mold core having a section including a mold finger portion that branches laterally outward from the exterior wall and extends substantially axially in the distal direction and is spaced from a portion of the exterior wall to define a mold recess therebetween; and removing the mold material by forcing the mold material off of the mold core. In one embodiment, the mold core is a multi-piece core comprising a central body and a sleeve positionable about the central body. The distal end of the sleeve comprises the finger portion when the sleeve is positioned on the central body. In yet another embodiment, the mold finger portion extends substantially parallel with and spaced from a portion of the mold core exterior wall.

DETAILED DESCRIPTION OF THE PREFERRED EMBODIMENTS

Figure 1:
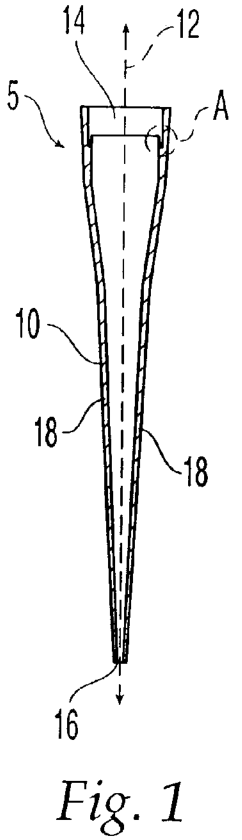
FIG. 1 is a cross-section view of a pipette tip member in accordance with the present invention.

In FIG. 1, a preferred pipette tip member 5 comprises an elongated tubular receptacle 10 extending along axis 12 having a rear or proximal opening 14 at a proximal end for axially receiving a distal end of a pipette shaft and a tip opening 16 at a distal end for dispensing fluid from the tip member. Receptacle 10 is generally conical in shape having a sidewall 18 that tapers or narrows from the proximal opening 14 to the tip opening 16. Tip member 5 is preferably formed of a plastic material, such as polypropylene.

In a preferred embodiment, sidewall 18 has a bifurcated section, shown in FIG. 1 as section "A", adjacent the proximal end of receptacle 10. As best seen in the cross-sectional view of FIG. 2, the bifurcated sidewall section comprises a base wall or first sidewall portion 20, with a second sidewall portion 22 and a third sidewall portion 24 that branch from first sidewall portion 20. The second and third sidewall portions 22, 24 extend substantially axially from first sidewall portion 20 in the proximal direction in a forklike fashion. The second sidewall portion 22 comprises an outside branch wall of receptacle 10, and third sidewall portion 24 comprises an inside branch wall of receptacle 10 spaced radially inward from second sidewall portion 24. In this regard, an axial section of sidewall 18 of receptacle 10 has a dual sidewall. Preferably, the third sidewall portion 24 has a free end 26 and the second sidewall portion 22 extends beyond free end 26 of third sidewall portion 24 in the proximal direction. Preferably third sidewall portion 24 has a length in the axial direction of about 0.050 inches and second sidewall portion 22 extends beyond free end 26 by about 0.090 inches. As one of skill in the art will understand, the bifurcated sidewall section shown in FIG. 2 extends annularly about central axis 12 to facilitate the releasably mating of a pipette shaft with receptacle 10.

Figure 2:
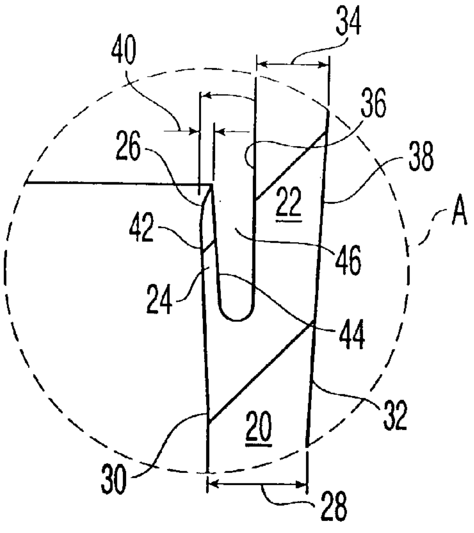
FIG. 2 is an enlarged axial fragmentary sectional view of the tip member of FIG. 1.

In one variation of the preferred embodiment, third sidewall portion 24 may extend inward at an angle α between about 0° and about 5° with respect to second sidewall portion 22 or first sidewall portion 20 when viewed in axial cross-section, as shown in FIG. 2. Preferably, the second and third sidewall portions 22, 24 are substantially parallel.

The first sidewall portion 20 has a first wall thickness 28 defined between a first inner wall surface 30 and a first outer wall surface 32. Preferably the first wall thickness is between about 0.010 inches and about 0.030 inches. Second sidewall portion 22 has a second wall thickness 34 defined between a second inner wall surface 36 and a second outer wall surface 38. Preferably the second wall thickness is between about 0.015 inches and about 0.025 inches. The third sidewall portion 24 has a third wall thickness 40 defined between a third inner wall surface 42 and a third outer wall surface 44. Preferably the third wall thickness is between about 0.005 inches and about 0.010 inches. In an alternate embodiment, the wall thicknesses can vary slightly in the axial direction. For instance, in one embodiment the third wall thickness is larger toward the base or first sidewall portion than at free end 26. As best seen in FIG. 2, first outer wall surface 32 and second outer wall surface 38 merge without discontinuity, such that the surfaces are contiguous and at least a portion of first outer wall surface 32 is collinear with at least a portion of second outer wall surface 38. The first inner wall surface 30 and the third inner wall surface 42 also merge without discontinuity, such that these inner surfaces are contiguous and at least a portion of first inner wall surface 30 is collinear with at least a portion of third inner wall surface 42. As shown in FIG. 2, a recess 46 is defined between the second and third sidewall portions 22, 24 and the recess 46 has an opening toward the proximal end 14 of tip member 5. Preferably the recess is about 0.015 inches wide in the radial direction.

In one variation of the preferred embodiment, second wall thickness 34 is less than first wall thickness 28. Also, preferably the third wall thickness 40 is less than the second wall thickness 34. In this regard, the third sidewall portion 24 is preferably bendably flexible in the radial direction. For example, when a pipette shaft is inserted into tip member 5, the third sidewall portion 24 may bend or flex radially outward toward second sidewall portion 22 to accommodate the pipette shaft. In this manner the third sidewall portion 24 is biased against the pipette shaft to form an annular fluid-tight seal with the pipette shaft. Thus, the inside branch wall or third sidewall portion 24 forms an annular inner sealing sleeve. As best seen in FIG. 2, in one aspect of the preferred embodiment, free end 26 of third sidewall portion 24 may be beveled to facilitate the alignment of the pipette shaft during insertion. Also, the third inner wall surface 42 may extend inward at an angle α between about 0° and about 5° with respect to first or second inner wall surfaces 30, 36. As a result, free end 26 of third sidewall portion 24 is spaced radially inward from first inner wall surface 30. Preferably free end 26 is spaced about 0.004 inches radially inward from surface 30. In this fashion, the third sidewall portion 24 may still permit relatively easy insertion of a pipette shaft while allowing sidewall portion 24 to bias inward against the shaft to create a fluid-tight seal.

Figure 3:
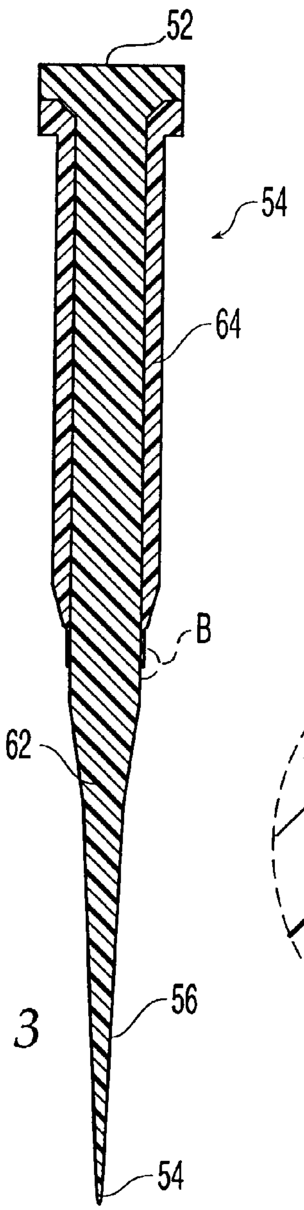
FIGS. 3 is an enlarged cross-sectional view of a mold body used to form the tip member of FIG. 1.
Figure 4:
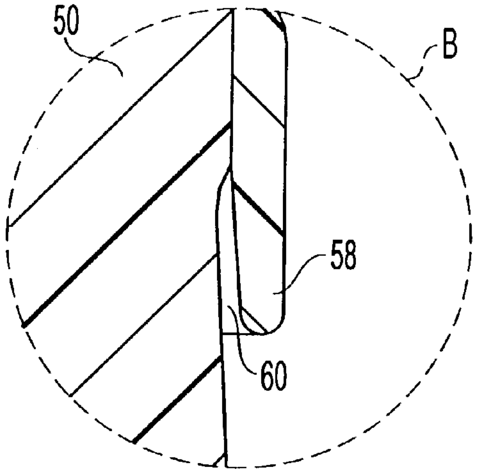
FIG. 4 is an axial fragmentary sectional view of the mold body of FIG. 3.

Tip member 5 is formed by molding, either injection molding or otherwise, between a mold core 50 and an outer mold shell (not shown). As can be seen in FIG. 3, the mold core 50 extends from a proximal end 52 to a distal end 54 and has an exterior wall 56 with a conical shape toward the distal end. Mold core 50 has a section, shown in FIG. 3 as section "B", including a mold finger 58 corresponding to the bifurcated section of sidewall 18 of tip member 5. Referring to FIG. 4, mold finger 58 branches laterally outward from exterior wall 56 and extends substantially axially in the distal direction corresponding to recess 46 of tip member 5. A mold recess 60 is defined in the space between the mold finger 58 and exterior wall 56 and corresponds to the third sidewall portion 24 of tip member 5. Mold finger 58 and recess 60 of mold core 50 have a geometry substantially mirroring the shape and size of the recess 46 and third sidewall portion of tip member 5, respectively. Preferably mold material is introduced around core 50 in a liquified state and flows into mold recess 60 and around mold finger 58 to form the third sidewall portion 24 and second sidewall portion 22 of the tip member 5. When the mold material solidifies, the mold shell is removed and tip member 5 is removed from the mold. In the preferred embodiment, tip member 5 may be removed from core 50 advantageously by advancing the tip member 5 in the distal direction or toward the tip of member 5 and forcing or moving the tip member in the distal direction off of core 50. Also, because the first inner wall surface 30 and third inner wall surfaces 42 merge without discontinuity, tip member 5 moves smoothly along core 50 during the demolding sequence. Accordingly, third sidewall portion of tip member 5, is less likely to be smeared or cut by the mold core 50 and damage to third sidewall portion 24 is minimized during the demolding sequence. Such a configuration advantageously allows for the formation of a tip member 5 with a bifurcated wall section with a flexible inner branch wall extending spaced radially inward from an outside branch wall to permit sealing sleeves to be molded on the interior of tip member 5 which in turn can enhance the seal that can be maintained between a pipette and the pipette tip member 5 during operation.

In one preferred embodiment, mold core 50 is a multi-piece core comprising a central body member 62 and a sleeve member 64 positionable about the central body member. Preferably sleeve member 64 is positioned adjacent the proximal portion of central body member 62 and extends around the circumference thereof. In this embodiment, when sleeve member 64 is positioned on central body member 62, the distal end of sleeve member 64 is preferably spaced from exterior wall 56 of central body member 62 to form the finger portion 58. Thus, the mold finger portion 58 extends substantially parallel with and spaced from exterior wall 56. A vent hole may be positioned at the proximal end of recess 60 to permit gases to escape the mold during the molding process. In an alternate mold core, a central channel may extend through the central body member to permit cooling fluid such as water to flow therethrough. In an alternative embodiment, central body member 62 may have a slight indentation opposite finger portion 58 to correspond to the angle inward of the third sidewall portion 24 described above.

Figure 5:
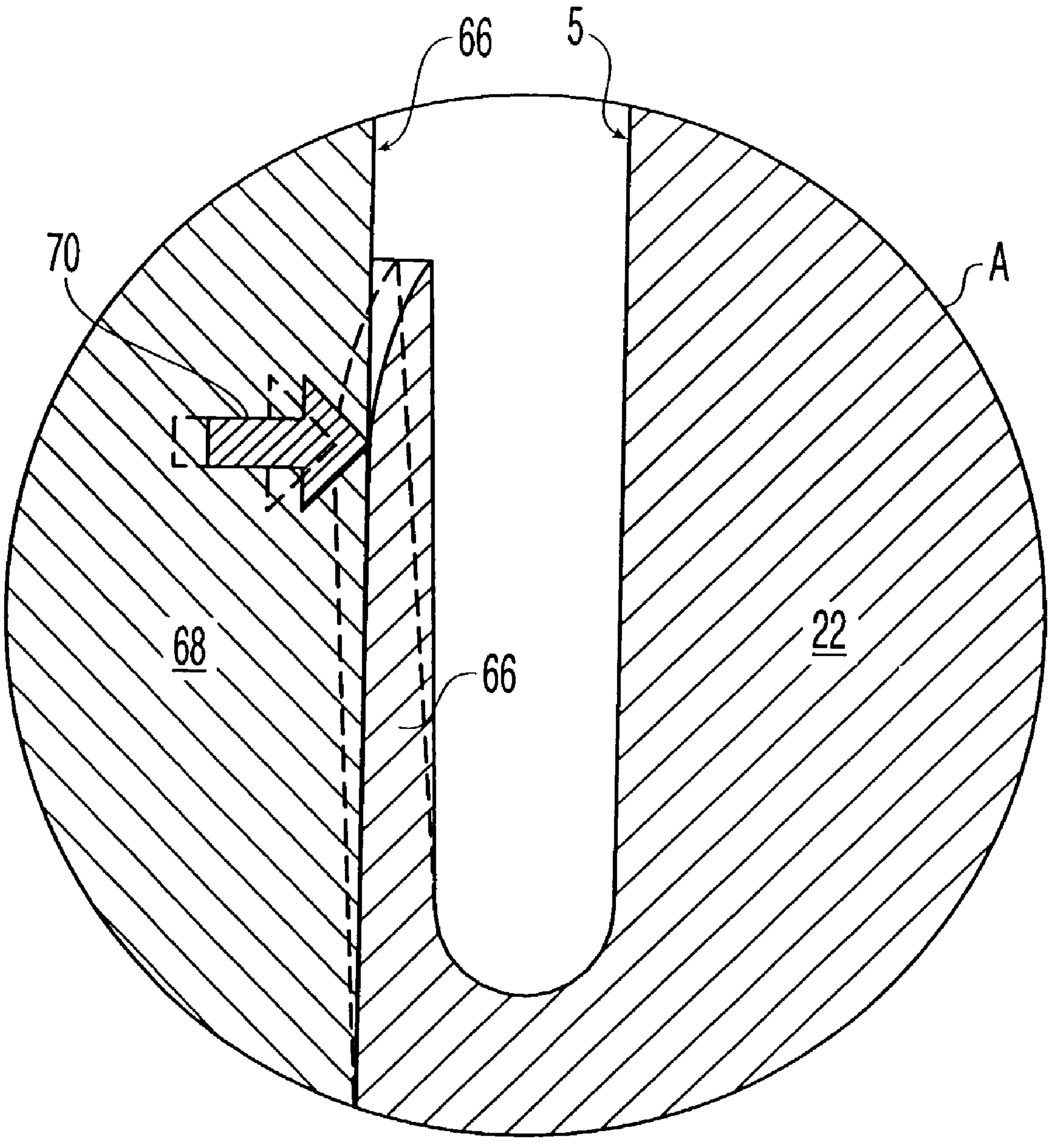
FIG. 5 is an enlarged cross-sectional view of the tip member of FIG. 1 receiving a distal end of a pipette shaft.

Referring now to FIG. 5, an enlarged cross-sectional view of the bifurcated section of the tip member of FIG. 1 is shown receiving a pipette shaft 66. Pipette shaft 66 is received in proximal opening 14 of the tip member 5. Pipette shaft 66 has a conical shaped shaft or distal end 68. By providing a bifurcated sidewall section, the resulting tip member will easily and smoothly receive the pipette shaft 66 and the force required to form a fluid-tight annular seal with the pipette is preferably minimized. When pipette shaft 66 is withdrawn or removed from tip member 5 it is also easily and smoothly released from bifurcated section such that the withdrawal force required is preferably minimized to alleviate the aforementioned dismounting problems commonly associated with pipettes.

Figure 6:
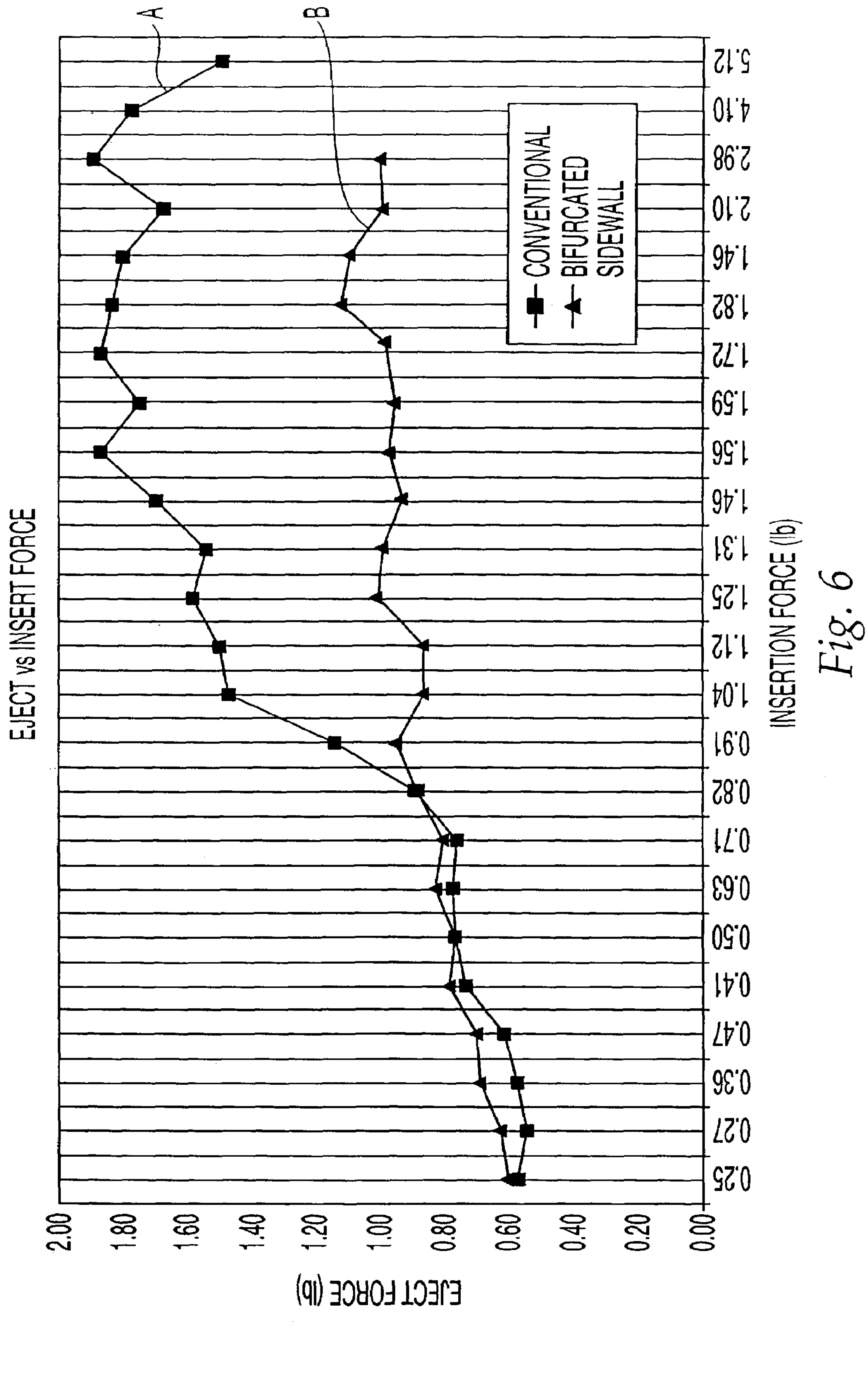
FIG. 6 shows an exemplary sample of a graph expressing a insertion force-exertion force curve between a conventional pipette tip member and a pipette tip member according to the present invention.

More particularly, in the preferred form of the tip member 5, the geometric dimensions of the third sidewall portion 24 provide increased flexibility as they may bend, deform, or provide a greater degree of forgiveness than a solid sidewall. Because of the flexibility and resilience of sidewall portion 24, as the shaft 68 of the pipette 66 moves into the receptacle 10 and engages the third sidewall portion 24, the third sidewall portion 24 bends laterally outward in the radial direction, as shown by arrow 70 to easily create a fluid tight seal. FIG. 6 shows a insertion-exertion force curve for a conventional pipette tip, curve A, which requires gradually more exertion force to remove the pipette from the pipette tip as the insertion force increases, i.e. depicts a curve having positive slope. Pipette tip members having a bifurcated sidewall section, however, require a much lower exertion force for a corresponding insertion force, as shown by curve B while maintaining the quality of the fluid-tight seal. Specifically, experimentation has shown that the same quality seal can be achieved with pipette tip members having a bifurcated wall section as in the present invention as with conventional pipette tip members, yet requiring less insertion and exertion forces.

Figure 7:
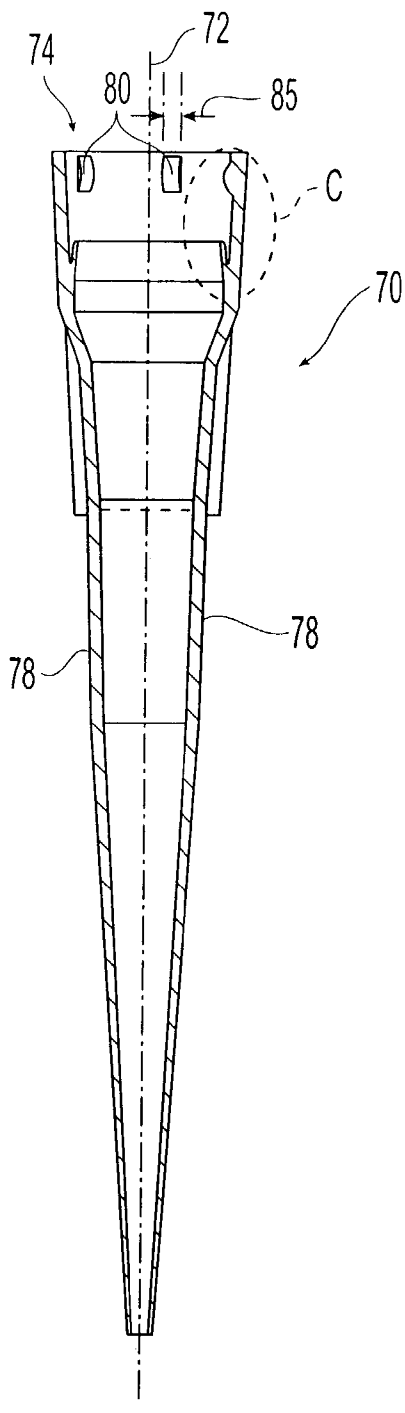
FIG. 7 is a cross-section view of another pipette tip member in accordance with the present invention.
Figure 8:
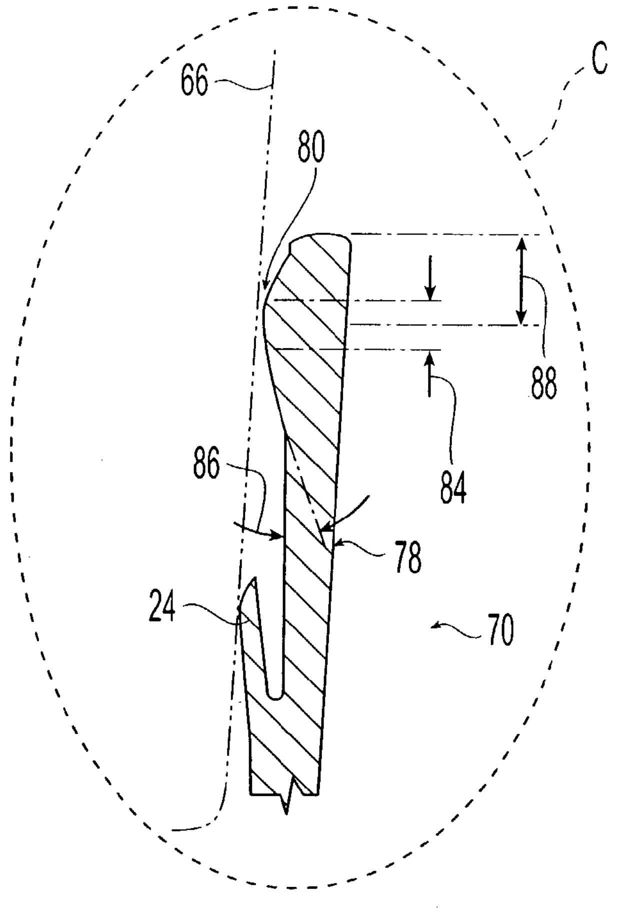
FIG. 8 is an enlarged fragmentary sectional view of the tip member of FIG. 7.

Referring now to FIGS. 7 and 8, a cross-sectional view of another pipette tip member in accordance with the present invention is shown that includes stabilizing projections 80 in addition to the bifurcated sidewall section described above. The tip member comprises an elongated tubular receptacle 70 extending along axis 72 having a rear or proximal opening 74 at a proximal end for axially receiving a distal end of a pipette shaft and a tip opening 76 at a distal end for dispensing fluid from the tip member. In a preferred embodiment, sidewall 78 has a plurality of stabilizing projections 80 proximal to the bifurcated sidewall section and adjacent the proximal end of receptacle 70. Stabilizing projections 80 are preferably configured and dimensioned to contact or come into close proximity to a pipette shaft 66 when inserted into tip 70 to facilitate better alignment and improved tip stability and seal. In one preferred embodiment, at least five (5) stabilizing projections are provided equally spaced angularly around the inner diameter of sidewall 78 adjacent the proximal end of receptacle 70. In another preferred embodiment, each projection 80 has a width 85 in the angular direction of about 0.030 inches.

As best seen in section "C" shown in the cross-sectional view of FIG. 8, the stabilizing projections 80 extend radially inward from sidewall 78 and include a contact surface 82 having an axial length 84. In a preferred embodiment axial length 84 is about 0.020 inches. In one preferred embodiment, surface 82 is arcuate and defines a radius of curvature of about 0.010 inches to about 0.020 inches. Alternatively, surface 82 can be substantially flat. The center of the contact surface 82 of each projection 80 is preferably spaced from the proximal end of pipette tip 70 by a distance 88. In a preferred embodiment, distance 88 is about 0.040 inches. The distal end of the projection is preferably tapered away at an angle 86 and gradually merges into sidewall 78. Preferably angle 86 is about 10° to about 30°. In addition to the aforementioned configuration of stabilizing projections, various other configurations of projections with different dimensions, geometry, quantity, and spacing could also be used.

One of ordinary skill in the art can envision numerous variations and modifications to the invention disclosed herein. For example, a plurality of bifurcated sidewall sections as described above can be spaced axially along the length of the tip member. All of these modifications are contemplated by the true spirit and scope of the following claims.

What is claimed is:

1. An ergonomic pipette assembly comprising a pipette shaft having a generally uninterrupted mounting surface;

a pipette tip comprising an elongated receptacle having an upper sidewall portion extending substantially parallel to the uninterrupted outer mounting surface of the pipette shaft and adapted to receive a distal end of the pipette shaft;

a plurality of stabilizing projections extending from the pipette tip upper sidewall portion for engaging the uninterrupted outer mounting surface of the pipette shaft and aligning the pipette shaft with the pipette tip;

the upper sidewall portion of the pipette tip having a bifurcated section for engaging the uninterrupted outer mounting surface of the pipette shaft, the bifurcated section comprising a substantially axially extending base wall and inside and outside branch walls that extend directly and substantially axially from the base wall in a proximal direction to form a forked shape, the inside branch wall having a free end spaced radially inward from the outside branch wall;

wherein when the distal end of the pipette shaft is inserted into the pipette tip, the uninterrupted outer mounting surface of the pipette shaft slides into lateral engagement with both the stabilizing projections and the inside branch wall when the distal end of the pipette shaft moves past the inside branch wall, causing the inside branch wall to flex radially outward towards the outside branch wall such that the inner surface of the inside branch wall biases against the uninterrupted outer mounting surface of the pipette shaft without substantial pressure in the axial direction in order to form both a fluid tight seal and a secure mount.

2. The pipette assembly of claim 1, wherein at least five stabilizing projections are provided around an inner diameter of the upper sidewall portion.

3. The pipette assembly of claim 2, wherein the stabilizing projections are equally spaced around the inner diameter.

4. The pipette assembly of claim 1, wherein each projection has a width in the angular direction of about 0.030 inches.

5. The pipette assembly of claim 1, wherein each stabilizing projection comprises an inner contact surface configured and dimensioned to contact or come into close proximity to the uninterrupted outer mounting surface of the pipette shaft to facilitate better alignment and improved tip stability and seal.

6. The pipette assembly of claim 5, wherein the contact surface has a length in the axial direction of about 0.020 inches.

7. The pipette assembly of claim 5, wherein the center of the contact surface is spaced from the proximal end of pipette tip in the axial direction by a distance of about 0.040 inches.

8. The pipette assembly of claim 5, wherein the contact surface is arcuate and has a radius of curvature between about 0.010 inches and about 0.020 inches.

9. The pipette assembly of claim 5, wherein the distal end of each stabilizing projection extends at an angle between about 0° and about 30° with respect to an inner wall surface of the upper sidewall portion.

* * * * *